3,075,962
PREPARATION OF CELLULOSE DERIVATIVE SULFATES UNDER NON-ACID CONDITIONS

Gordon D. Hiatt and Martin E. Rowley, Rochester, N.Y., assignors to Eastman Kodak Company, Rochester, N.Y., a corporation of New Jersey
No Drawing. Filed Sept. 16, 1960, Ser. No. 56,347
7 Claims. (Cl. 260—215)

This application relates to the preparation of cellulose acylate and alkylate sulfates under non-acid conditions.

Known methods of preparing cellulose acylate sulfates employ acidic type catalysts. In the case of many acid esterification catalysts, degradation of the cellulose chains is prevented or minimized only with difficultly controlling the reaction, lower temperatures being required in those procedures. It is ordinarily advantageous to prepare water soluble cellulose derivatives with longer chain lengths to give high viscosity to dilute aqueous solutions prepared therefrom. The preparation of cellulose acylate sulfates under non-acid conditions is characterized by minimum reduction of cellulose chain length during sulfation.

One object of our invention is to provide a method for forming cellulose acylate sulfates and cellulose ether sulfates in which the reaction is carried out under non-acid conditions. Another object of our invention is to provide a method for preparing cellulose acylate sulfates and cellulose ether sulfates in which breakdown of the cellulose is minimized during sulfation. A further object of our invention is to provide a method of preparing cellulose derivative sulfates which employs an alkali metal salt of acyl sulfuric acid prepared without the use of excess sulfuric acid. A still further object of our invention is to provide a method of preparing cellulose derivative sulfates employing a neutral or basic reaction bath. Other objects of our invention will appear herein.

In its broadest aspects, our invention comprises the esterification of cellulose with an esterification liquid comprising a lower fatty acid anhydride and an alkali metal salt of acyl sulfuric acid. The reaction will go when the acyl sulfuric acid is completely neutralized, even in the presence of an excess of base. The esterification when cellulose is the starting material is carried out at an elevated temperature such as in the range of 90–120° C. If the starting material is a cellulose derivative, a temperature of 20° C. or more can be used in the esterification procedure. It is also desirable to employ lower fatty acid anhydride in the reaction in an amount of at least 50% in excess of that required to give the necessary esterification. In some cases it may be desirable to pretreat the cellulose with sulfuric acid, the sulfuric acid being neutralized in the esterification proper. When a basic medium is employed, it is desirably from an alkali metal salt of a fatty acid such as acetic, corresponding to the lower fatty acid anhydride. The alkali metal salt is preferably used in proportions of not more than 50% in excess of the amount of base required to neutralize the acylate sulfate.

The sulfating mixture is prepared by adding sulfuric acid to acetic anhydride at a temperature below 25° C. following which an alkali salt of the fatty acid is added. When the presence of base is desired, the salt is conveniently added in excess of the amount required to neutralize the acyl sulfuric acid formed. When sulfuric acid is added to acetic anhydride, the solution is strongly acidic to crystal violet indicator. Upon the addition of sodium acetate, in a molar equivalent to the sulfuric acid, the solution is neutral to this indicator. Additional quantities of the metal salt produced a solution which is basic to this indicator. The solution thus formed is mixed with the cellulose wet with either acetic anhydride or a mixture of acetic anhydride and acetic acid. If desired, other lower fatty acid anhydrides than acetic anhydride such as propionic anhydride or butyric anhydride may be employed. One of the advantages of proceeding in this manner is that there is no need to neutralize the catalyst at the end of the reaction period. The process in accordance with our invention may be employed to esterify either cellulose or a cellulose ester or cellulose ether having free and esterifiable hydroxyl groups. Esterification of the cellulose derivatives can be carried out at any temperature above 20° C. using a basic bath. The following examples illustrate our invention:

Example 1

25 parts of acetic anhydride were cooled to 5° C. and were mixed with 7 parts of cooled 95% sulfuric acid, the temperature being maintained below 25° C. during the mixing. 6.6 parts of anhydrous sodium acetate were then added continuing the stirring with the temperature below 35° C. forming a sulfating liquid of the sodium salt of acetyl sulfuric acid. 10 parts of acetylation-grade wood pulp which had been activated with water and dewatered with acetic acid and which contained 214 parts of acetic acid were mixed with the sulfating liquid. The mass was stirred for 30 minutes at lower temperature whereupon 50 parts of acetic anhydride were added and the mixture was heated on the steam bath for 6 hours. The fibrous product was filtered, washed with acetone to remove acetic acid and anhydride and dried at 50° C. overnight. A water soluble cellulose acetate sulfate was obtained having a content of 19.5% apparent acetyl and 8.8% total sulfur.

Example 2

700 parts of acetic anhydride, 200 parts of 95% sulfuric acid and 180 parts of sodium acetate were combined to form a sulfating liquid as described in Example 1. 300 parts of pulp which had been activated with water and dewatered with acetic acid, 800 parts of acetic acid, and 200 parts of acetic anhydride were mixed with the prepared sulfating liquid in a mixer for 30 minutes at 32° C. The cellulose was then sulfated by heating to a temperature of 110° C. for a period of 2 hours. The mixture was cooled and 1,000 parts of water were added giving a grainy dope. The temperature of the mass was adjusted to 38° C. and the mixer was run for 2 hours destroying excess anhydride. The product was washed with isopropanol then with dilute sodium carbonate in isopropanol-water (to neutralize any acetic acid present) and was dried at 50° C. The water soluble cellulose acetate sulfate obtained had an apparent acetyl content of 21.4% and a total sulfur content of 8.69%.

Example 3

800 parts of acetic anhydride, 200 parts of 95% sulfuric acid and 190 parts of sodium acetate were combined to form a sulfating liquid as described in Example 1. 300 parts of wood pulp were activated with water, dewatered with acetic acid and were pretreated with a solution of 2.78 parts of concentrated sulfuric acid in 600 parts of acetic acid for 1 hour at 38° C. The prepared sulfating liquid and 1,200 parts of acetic anhydride were mixed with the cellulose, the temperature being raised to 110° C. The excess sodium acetate present neutralized the sulfuric acid. The reaction was run for about 2 hours at the 110° temperature and the product was completely water soluble. Isolation of the product (cellulose acetate sulfate) was carried out as described in Example 2 but without the addition of water. The product gave high viscosity solutions with very little grain in water at 2% concentration.

Example 4

A sulfating mixture was prepared by slowly adding 7 parts of 95% sulfuric acid to 20 parts of acetic anhydride, the mass being kept below 25° C. during the entire addition and then adding 6 parts of anhydrous sodium acetate to the solution with continued stirring and limited temperature until completely dissolved. This sulfating mixture was added to a solution of 17 parts of ethyl cellulose (45% ethoxyl) in 80 parts of glacial acetic acid warmed to 40° C. The mass was stirred for 10 minutes then cooled and precipitated by pouring into isopropanol, which precipitate was washed with isopropanol and dried. Analysis of the water soluble product indicated a total sulfur content of 6.77%.

We claim:

1. A method of preparing cellulose derivative sulfates which comprises reacting upon an esterifiable cellulose material selected from the group consisting of cellulose, lower fatty acid cellulose esters and ethyl cellulose with an esterifying bath non-acid to crystal violet indicator comprising acetic anhydride in an amount at least 50% excess of theoretical and an alkali metal salt of acetyl sulfuric acid.

2. A method of preparing cellulose acylate sulfates which comprises reacting upon cellulose with an esterifying bath non-acid to crystal violet indicator comprising acetic anhydride in an amount at least 50% excess of theoretical and the sodium salt of acetyl sulfuric acid.

3. A method of preparing cellulose acylate sulfates which comprises reacting upon cellulose with an esterifying bath non-acid to crystal violet indicator comprising acetic anhydride in an amount at least 50% excess of theoretical, an alkali metal salt of acetyl sulfuric acid and sodium acetate in not more than 50% excess.

4. A method of preparing cellulose acylate sulfates which comprises reacting upon cellulose with an esterifying bath non-acid to crystal violet indicator comprising acetic anhydride in an amount at least 50% excess of theoretical, the sodium salt of acetyl sulfuric acid and sodium acetate in not more than 50% excess.

5. A method of preparing cellulose ether sulfates which comprises reacting upon ethyl cellulose with an esterifying bath non-acid to crystal violet indicator comprising acetic anhydride in amount at least 50% excess of theoretical and an alkali metal salt of acetyl sulfuric acid.

6. A water soluble alkali metal salt of ethyl cellulose sulfate.

7. Water soluble sodium ethyl cellulose sulfate.

References Cited in the file of this patent

UNITED STATES PATENTS 2,143,332    Sindl et al. _____ Jan. 10, 1939